Feb. 18, 1964  F. MARTI ETAL  3,121,811
SPEED GOVERNOR FOR MINIATURE ELECTRIC MOTOR
Filed June 27, 1960  2 Sheets-Sheet 1
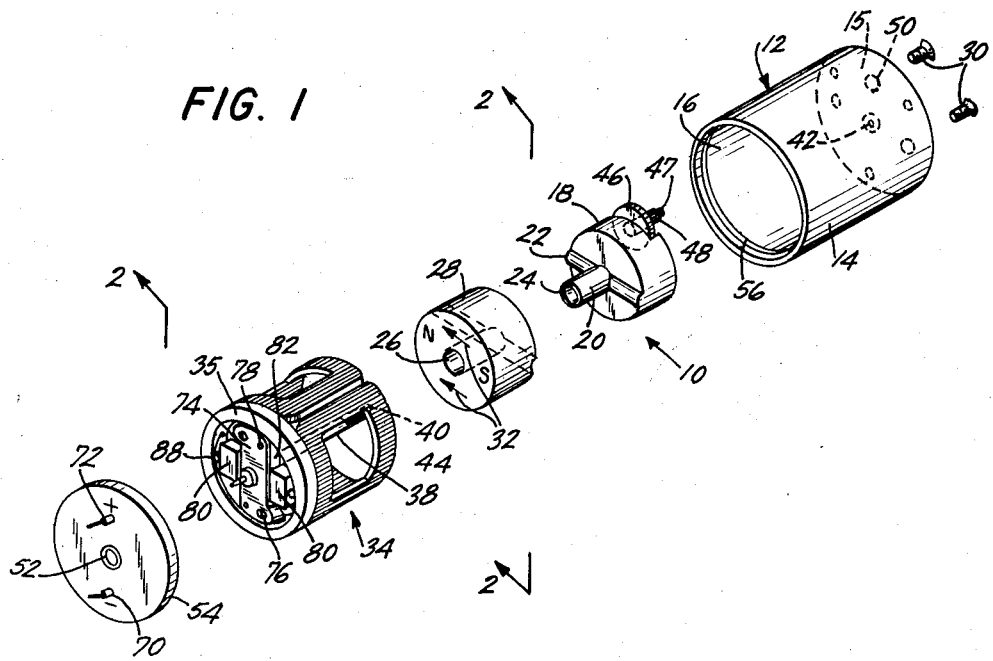
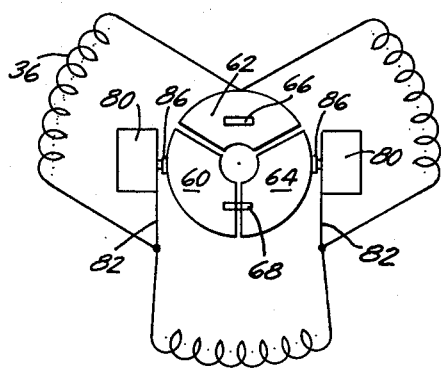
INVENTORS
FREDERIC MARTI
GEORGES BRAUNSCHWEIG
BY
Curtis, Morris & Safford
ATTORNEYS Feb. 18, 1964

F. MARTI ETAL 3,121,811

SPEED GOVERNOR FOR MINIATURE ELECTRIC MOTOR

Filed June 27, 1960

INVENTORS
FREDERIC MARTI
GEORGES BRAUNSCHWEIG
BY
*Curtis, Morris & Safford*
ATTORNEYS

United States Patent Office 3,121,811
Patented Feb. 18, 1964

3,121,811
SPEED GOVERNOR FOR MINIATURE
ELECTRIC MOTOR
Frederic Marti and Georges Braunschweig, both of 165
Rue Numa-Droz, La Chaux-de-Fonds, Switzerland
Filed June 27, 1960, Ser. No. 38,898
Claims priority, application Switzerland July 11, 1959
2 Claims. (Cl. 310—48)

This invention relates to an electric motor, more particularly to a miniature electric motor which can be operated from a small flashlight battery, for example.

An object of this invention is to provide an electric motor which is very small in size but yet is simple and inexpensive to manufacture.

Another object is to provide such a motor which though small in size is rugged and reliable, and relatively quite powerful and efficient.

These and other objects will in part be understood from and in part pointed out in the following description.

There are many applications such as in measuring instruments, clockwork mechanisms, battery operated razors, toys, and so forth, where a miniature electric motor is useful. However, because of the small size necessarily required with such a motor, problems of construction and operating efficiency are raised. Most conventional motor designs are not suitable for miniaturization because of the difficulty of fabricating and assembling the component parts when scaled down to sufficiently small size. On the other hand, previous motors designed especially for small size and to avoid to the extent possible problems in manufacture and assembly have sacrificed mechanical strength and reliability. Moreover, the efficiency of these motors is relatively low. The present invention provides a miniature electric motor which possesses the combined virtues desired in such a motor.

In accordance with the present invention in one specific embodiment thereof there is provided an electric motor having a volume of somewhat less than a cubic inch and able to handle a power input of about one quarter watt. This motor comprises a cylindrical permanent magnet centrally fixed within a cup-shaped housing of magnetic material. This magnet has a central hole through it into which projects a hollow hub of a rigid plastic base by means of which the magnet is secured within the housing. The magnet is centered within the housing and defines with it an annular air gap across which is maintained a transverse bi-polar magnetic field. Positioned within this gap are the windings of a rotor, these windings in this embodiment being rigid and shaped as curved segments supported at one end by a molded plastic disc. This disc in turn is rigidly mounted on an axle or shaft which extends through the central hole in the magnet to a bearing in the end of the housing. The other end of the axle is supported by a bearing in a plastic cover which closes the housing. The design of the parts of this motor readily permits them to be made very small in size and yet they can easily and quickly be assembled. These parts are very rugged mechanically and good electrical efficiency is obtained.

A better understanding of the invention together with a fuller appreciation of its many advantages will best be gained from the following description given in connection with the accompanying drawings wherein:

FIGURE 1 is a perspective view showing in exploded relation the parts of a motor embodying the invention;

FIGURE 4 is a schematic wiring diagram of the motor.

Figure 2:
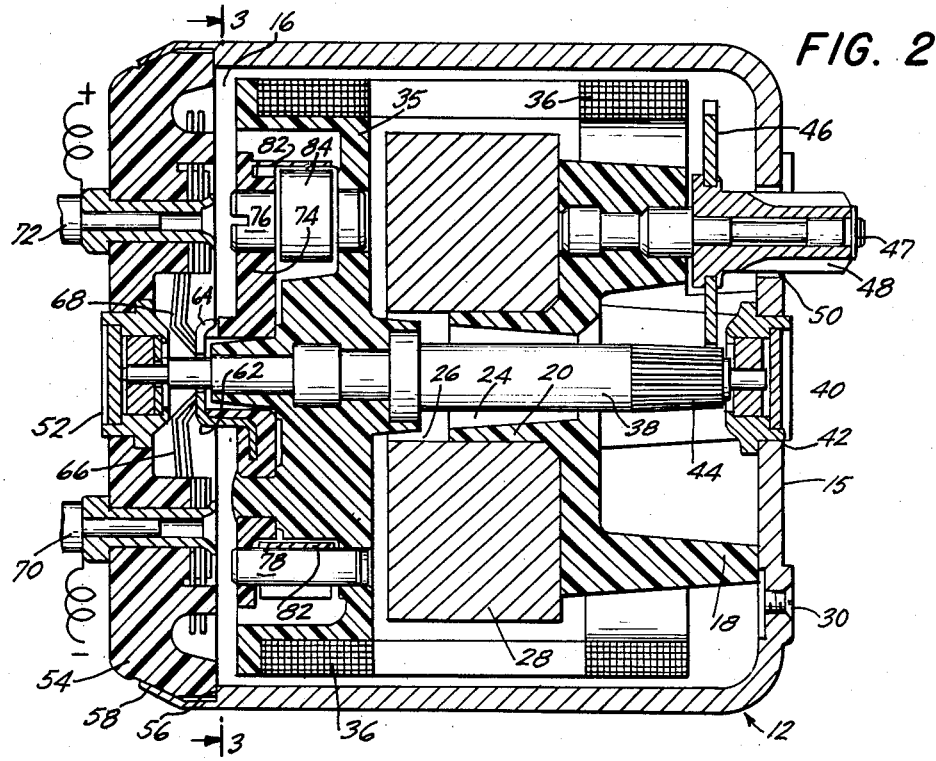
FIGURE 2 is a section view, greatly enlarged in scale, taken along the lines 2—2 in FIGURE 1 and showing the motor assembled.

The motor 10 shown in FIGURE 1 comprises a cup-shaped housing 12 of magnetic material. This housing has a cylindrical wall 14, an integral top 15 and an open end 16. To the left of the housing is a molded plastic base 18 having on its left-hand end a hub 20 and an indexing rib 22. This hub and the base have an axial hole 24 extending through them. The hub fits snugly within a mating hole 26 in a cylindrical permanent magnet 28 which has an indentation across its right-hand face corresponding to rib 22 on base 18. When magnet and base are thus fixed together they fit centrally within housing 12, being held in place against top 15 by a pair of screws 30.

Magnet 28 is transversely polarized as indicated by arrows 32, and is smaller in diameter than the inside of housing 12 forming in conjunction therewith an annular opening. Into this opening, see also FIGURE 2, fit the windings of a rotor 34. The latter includes a plastic disc-like base 35 on which are mounted three curved, square shaped coils 36. These coils are formed of a suitable number of turns of fine wire and are self-supporting, being impregnated with a suitable material, such as epoxy resin. They closely fit within the annular space between magnet and housing.

Centrally projecting through disc 35 and molded within it is a shaft 38 by means of which this assembly is rotatably supported. The right end of this shaft, as seen also in FIGURE 2, passes through hole 24 and has a nib 40 which fits into a bearing 42 carried by top 15. Just behind nib 40 this right end is milled into a gear 44 which meshes with a disc gear 46 rotatably mounted by means of a pin 47 on base 18. Integral with the latter is a smaller sleeve gear 48 which passes freely out through a hole 50 in top 15. The other end of shaft 38 is supported in a bearing 52 molded in a plastic cover 54 by means of which the housing is closed. With the parts assembled as seen in FIGURE 2, cover 54 is seated against a shoulder 56 inside the housing, being secured thereto by crimping the edge of the housing around the cover as indicated at 58.

Figure 3:
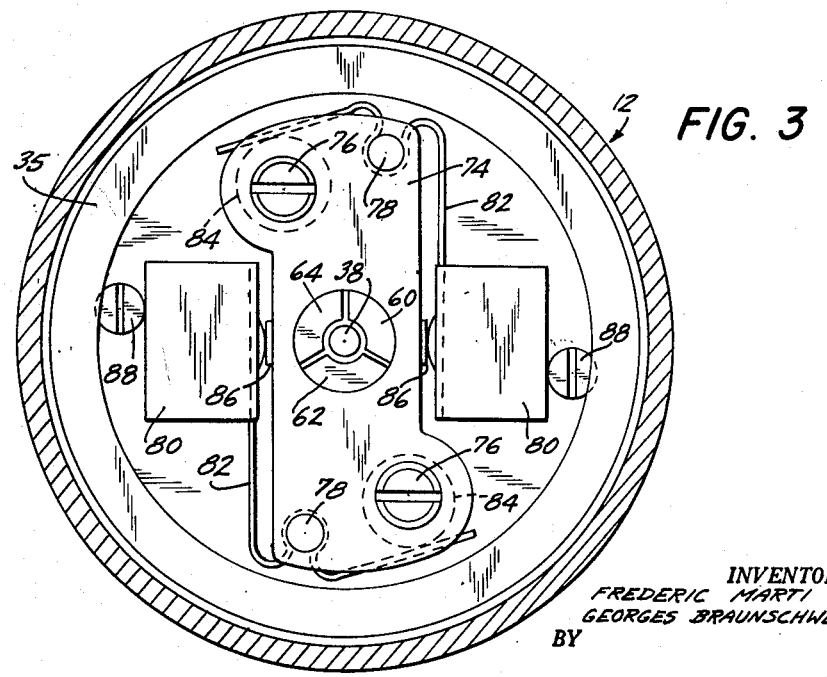
FIGURE 3 is a cross-section taken as indicated by the lines 3—3 in FIGURE 2.

As seen in FIGURES 1, 2 and 3, the left end of rotor shaft 38 is surrounded by three commutator segments 60, 62 and 64, insulated from each other, and connected to respective ones of coils 36. These segments are contacted on their end face by a pair of brushes 66 and 68 carried by cover 54 and connected respectively to posts 70 and 72 and conductive leads attached thereto.

Within the outer face of rotor disc 35 is recessed a bar-shaped plastic member 74 which is fastened to the disc by a pair of screws 76 and a pair of pins 78. Commutator segments 60, 62, and 64 are molded into plastic bar 74 being thus held concentric with the end of shaft 38 and insulated therefrom. As seen best in FIGURE 3, on each side of bar 74, is positioned a centrifugal switch comprising a weight 80 carried on the end of a leaf spring 82. The center of each spring is looped or fulcrumed part way around a respective pin 78, the rear end of the spring bearing against an eccentric portion 84 of screw 76. Thus by rotating screw 76, the pressure with which each weight 80 is forced against a contact 86 (see also FIGURE 4), one of which is connected to commutator segment 60 and the other to segment 64, can be adjusted. Screws 76 are adjusted so that each weight 80 bears against its contact 86 with the same force. When the rotational speed of rotor 34 exceeds a given value (e.g. 1500 r.p.m.) each centrifugal switch opens and turns off the current to coils 36. By this means, the speed of rotor 34 can be governed within closely set limits. The outward movement of each weight is adjustably limited to the same amount by a respective one of the eccentric screws 88 carried by disc 35.

It will now be appreciated that the parts of motor 10 because of their unique design can easily be fabricated and assembled. The self-supporting arrangement of coils 36 on disc 35 permits the rotor to be assembled to close tolerances even though its diameter may be only a small fraction of an inch. Magnet 18 is suitably one having high coercive force (e.g. 1500 oersteds) such as a ceramic permanent magnet. FIGURES 1–3 of the drawings herein were made from an actual motor and show its various parts to scale. The length of housing 12 was 1⅛ inch and its outer diameter, 1 inch.

The above description of the invention is intended in illustration and not in limitation. Various changes and modifications in the embodiment set forth may occur to those skilled in the art and these can be made without departing from the spirit or scope of the invention as set forth.

We claim:

1. In a miniature electric motor of the character described, a cup-like housing and magnet means defining a magnetic field, a rotor coaxially mounted within said housing and having windings in said field, a base fixed at one end of said windings opposite an end of said magnet, and a plurality of centrifugal switches on said base, said switches being mounted in symmetrical balanced relation to the longitudinal axis of said windings, each switch being in series with at least one of said windings and including a leaf spring pivoted at one end to said base and having a free end on which is mounted a contact and weight, a respective contact fixed to said base radially inward and opposite the free end of said spring, each spring contact and weight being movable substantially along a radius from the axis of said windings, and a respective eccentric cam acting on each of said springs to adjust the lateral pressure of its free end against said fixed contact.

2. The structure in claim 1 wherein each spring is a flat leaf spring which is approximately L-shaped and which has a reverse bend at its corner to form a cylindrical hole or eyelet, said spring eyelet pivotally surrounding a pin in said base, said cam engaging an inner side of one end of said spring, the other end of said spring carrying said contact and weight and engaging said fixed contact.

References Cited in the file of this patent

UNITED STATES PATENTS

| | | |
|---|---|---|
| 1,793,834 | Baisch | Feb. 24, 1931 |
| 2,478,848 | Sullivan et al. | Aug. 9, 1949 |
| 2,849,630 | Woloff et al. | Aug. 26, 1958 |
| 2,916,684 | Schneider | Dec. 8, 1959 |
| 2,952,788 | Volkerling et al. | Sept. 13, 1960 |

FOREIGN PATENTS

| | | |
|---|---|---|
| 123,423 | Australia | Jan. 24, 1947 |
| 1,039,127 | Germany | Sept. 18, 1958 |